(12) United States Patent
Reusch

(10) Patent No.: US 12,377,575 B2
(45) Date of Patent: Aug. 5, 2025

(54) LIGHTWEIGHT APPARATUS FOR LARGE SCALE ADDITIVE MANUFACTURING WITH CEMENTITIOUS MATERIALS

(71) Applicant: James Lyman Reusch, Midvale, UT (US)

(72) Inventor: James Lyman Reusch, Midvale, UT (US)

( * ) Notice: Subject to any disclaimer, the term of this patent is extended or adjusted under 35 U.S.C. 154(b) by 494 days.

(21) Appl. No.: 17/962,041

(22) Filed: Oct. 7, 2022

(65) Prior Publication Data

US 2023/0134177 A1  May 4, 2023

Related U.S. Application Data

(63) Continuation-in-part of application No. PCT/US2022/022209, filed on Mar. 28, 2022, and a continuation-in-part of application No. PCT/US2022/022197, filed on Mar. 28, 2022.

(60) Provisional application No. 63/166,970, filed on Mar. 26, 2021.

(51) Int. Cl.
*B28B 1/00* (2006.01)
*B28B 17/00* (2006.01)
*B33Y 30/00* (2015.01)
*E04G 21/04* (2006.01)
(Continued)

(52) U.S. Cl.
CPC .......... *B28B 1/001* (2013.01); *B28B 17/0081* (2013.01); *B33Y 30/00* (2014.12); *E04G 21/04* (2013.01); *E04G 21/0436* (2013.01); *E04G 21/0463* (2013.01); *B29C 64/227* (2017.08); *B33Y 50/02* (2014.12); *E04G 2021/049* (2013.01)

(58) Field of Classification Search
CPC ..... B28B 1/001; B33Y 30/00; E04G 21/0436; E04G 21/0463; E04G 2021/049
See application file for complete search history.

(56) References Cited

U.S. PATENT DOCUMENTS 2,896,659 A * 7/1959 Erickson .................. B67D 7/04
242/379.2
7,814,937 B2 * 10/2010 Khoshnevis ............ B66C 23/36
137/899

(Continued)

FOREIGN PATENT DOCUMENTS

CN      107665752 A  *  2/2018  ............. H01B 7/423
CN      109518974 A  *  3/2019  ............. B33Y 30/00
(Continued)

*Primary Examiner* — Benjamin A Schiffman
(74) *Attorney, Agent, or Firm* — Steven Rinehart

(57) ABSTRACT

An example apparatus for additive manufacturing can include at least three legs including trussing beams and an upper frame supported at a target height by the legs. The upper frame can include an x-axis member extending between two of the legs and a y-axis member extending between two of the legs. An x-axis gantry can be coupled to the y-axis member and extend parallel to the x-axis member. The x-axis gantry can be slidably moveable along the y-axis member. An x-axis carriage can be coupled to the x-axis gantry and slidable moveable along the x-axis gantry. A telescoping z-axis member can be coupled to the x-axis carriage. A cementitious material delivery hose can have an outlet coupled to the z-axis member so that the outlet moves along a z-axis.

27 Claims, 8 Drawing Sheets

(51) Int. Cl.
*B29C 64/227* (2017.01)
*B33Y 50/02* (2015.01)

(56) References Cited

U.S. PATENT DOCUMENTS

| | | | | |
|---|---|---|---|---|
| 8,029,710 | B2 * | 10/2011 | Khoshnevis | B25J 19/002 |
| | | | | 212/312 |
| 10,259,137 | B2 * | 4/2019 | Israel | B33Y 50/02 |
| 10,851,538 | B2 * | 12/2020 | Le Roux | E04B 1/34823 |
| 11,167,444 | B2 * | 11/2021 | Le Roux | B28B 1/001 |
| 11,173,656 | B2 * | 11/2021 | Yeoh | B29C 70/222 |
| 11,179,927 | B2 * | 11/2021 | Ford | B33Y 10/00 |
| 11,273,574 | B2 * | 3/2022 | Kreiger | B33Y 30/00 |
| 11,408,166 | B2 * | 8/2022 | Le Roux | B28B 1/001 |
| 11,472,104 | B2 * | 10/2022 | Overby | B29C 64/236 |
| 12,151,394 | B2 * | 11/2024 | Na | B29C 64/209 |
| 12,209,422 | B2 * | 1/2025 | Bramberger | B66C 23/283 |
| 2005/0280185 | A1 * | 12/2005 | Russell | B29C 64/165 |
| | | | | 425/375 |
| 2014/0252668 | A1 * | 9/2014 | Austin | B28B 3/20 |
| | | | | 425/375 |
| 2016/0236407 | A1 * | 8/2016 | Armani | B29C 64/118 |
| 2017/0350115 | A1 * | 12/2017 | Rocher | B29C 64/209 |
| 2018/0071949 | A1 * | 3/2018 | Giles | B28B 1/001 |
| 2018/0086008 | A1 * | 3/2018 | Northrup | B33Y 30/00 |
| 2020/0122751 | A1 * | 4/2020 | Markelz | B66C 17/04 |
| 2021/0107177 | A1 * | 4/2021 | Giles | E04B 1/35 |
| 2022/0314537 | A1 * | 10/2022 | Indyk | B29C 64/393 |
| 2023/0323999 | A1 * | 10/2023 | Sergison | B28B 1/001 |
| | | | | 248/70 |
| 2023/0366222 | A1 * | 11/2023 | Pettit | E04G 21/0427 |
| 2024/0165850 | A1 * | 5/2024 | Reusch | B25J 19/0025 |
| 2024/0300171 | A1 * | 9/2024 | Reusch | B29C 64/209 |
| 2025/0092695 | A1 * | 3/2025 | Le Roux | B28B 1/001 |

FOREIGN PATENT DOCUMENTS

| | | | |
|---|---|---|---|
| CN | 210347290 U | * | 4/2020 |
| JP | 2006043653 A | * | 2/2006 |
| WO | WO-2024093329 A1 | * | 5/2024 ........ B29C 64/118 |

* cited by examiner

LIGHTWEIGHT APPARATUS FOR LARGE SCALE ADDITIVE MANUFACTURING WITH CEMENTITIOUS MATERIALS

CROSS-REFERENCE TO RELATED APPLICATIONS

This application is a continuation-in-part of PCT International Application No. PCT/US22/22209, filed Mar. 28, 2022 and of PCT International Application No. PCT/US22/22197, filed Mar. 28, 2022 both of which claim priority to U.S. Provisional Application No. 63/166,970 filed on Mar. 26, 2021, which are each incorporated by reference herein.

BACKGROUND OF THE INVENTION

1. Field of the Invention

The present invention relates to the printing of structures by the deposition of cementitious materials such as mortar. More specifically, the invention relates to a support structure of a device, a system, and a method for the additive manufacturing ("3D printing") of structures by material deposition.

2. Background 3D printing makes it possible to produce a wide variety of physical objects by additive manufacturing methods, that is to say by the repetitive and successive deposition of layers of material.

Initially used for the rapid prototyping of objects, 3D printing is now used to manufacture functional parts and specifically in a variety of fields such as construction where cementitious materials or other suitable materials are deposited in place for the creation of buildings or edifices.

The benefit of 3D printing for the construction of buildings or other structures is the approximate 30% to 60% reduction of construction waste coupled with a shortening of the production lead times by 50% to 70% when compared to conventional construction methods and materials.

Currently, there are several types of technologies for the construction of buildings using 3D printing. Some technologies use gantry systems running on rails where the rails support the printing head of the printer and which bracket the construction zone. These 3D printers are often smaller in size and may be used to create objects made of plastics or metals that are of a relatively small size. The drawback with this type of technology is the relative bulk of the system and the relatively large structure of rails which completely encompasses the building or structure to be created.

One attempt to resolve this problem involves a 3D printer that comprises a robotic arm, allowing the 3D printer to be placed at or near the center of the construction zone, thereby avoiding the installation of a gantry and rail system since the robotic arm can be rotated into the desired position for deposition of various materials. However, the method also has limitations associated with placing the robotic arm and then extracting the robotic arm and support structure after the structure has been completed or substantially completed.

To overcome the above-mentioned limitations caused by the use of a robotic arm or a gantry running on rails, or indeed a combination of the two, in terms of height and of action perimeter, new 3D printing systems have emerged and now make it possible for a print head, used to deposit the material, to be affixed to a crane with a lattice structure type. These systems may be voluminous, heavy and the installation process tends to be complex because it can involve adapting the crane fixing system for each specific printing system and construction location. Furthermore, crane-type printing systems may pose problems of stability and the amount energy used to pump the deposition material to the top of the crane and the printing head for deposition. Cranes also typically require further licensing and training to operate. Additionally, the management of the hoses that are used to deliver the deposition material is often challenging and the prior art devices are limited in this regard.

A further problem faced by prior designs lies in the difficulty of placing printing material in and around obstructions in the print space. At times, the removal of obstructions is untenable while at other times, the obstructions themselves are integral to the final product. For example, prior designs are unable to print cementitious structures with rebar supports due to the bulk of the printhead or the lattice structure which cannot reach the desired print location because of interference from the added rebar. Obstructions may not be limited to rebar either as internal piping, proximity to neighboring structures, and other unexpected obstacles may prevent printing in the desired location.

Accordingly, there remains a need for a printing system that mitigates the defects of the current systems, drawbacks, and obstacles of the prior art. Particularly, a device that makes it possible to control the conditions of printing of the structure to be printed, in particular the position and maneuverability of the printing head, to reduce the labor costs and the time. Without such improvement in the art, 3D printing for buildings and other structures will continue to be suboptimal.

BRIEF SUMMARY OF THE INVENTION

The present disclosure describes apparatus for additive manufacturing using cementitious material. These apparatus can be used for large scale additive manufacturing, such as 3D printing of buildings and other large scale projects. Additionally, the apparatus can include a lightweight support structure that can be easily set up at a build site and taken down after building is complete. In one example, an apparatus for additive manufacturing can include at least three legs that include trussing beams. An upper frame can be supported at a target height by the legs. The upper frame can include: a x-axis member extending between two of the legs; a y-axis member extending between two of the legs; an x-axis gantry coupled to the y-axis member and extending parallel to the x-axis member, wherein the x-axis gantry is slidably moveable along the y-axis member; an x-axis carriage coupled to the x-axis gantry and slidably moveable along the x-axis gantry; and a telescoping z-axis member coupled to the x-axis carriage. The apparatus can also include a cementitious material delivery hose having an outlet coupled to the z-axis member such that the outlet moves along a z-axis.

BRIEF DESCRIPTION OF THE DRAWINGS

The various embodiments of the present invention may be described in conjunction with the appended drawings wherein like designations denote like elements, and.

DETAILED DESCRIPTION

Figure 1:
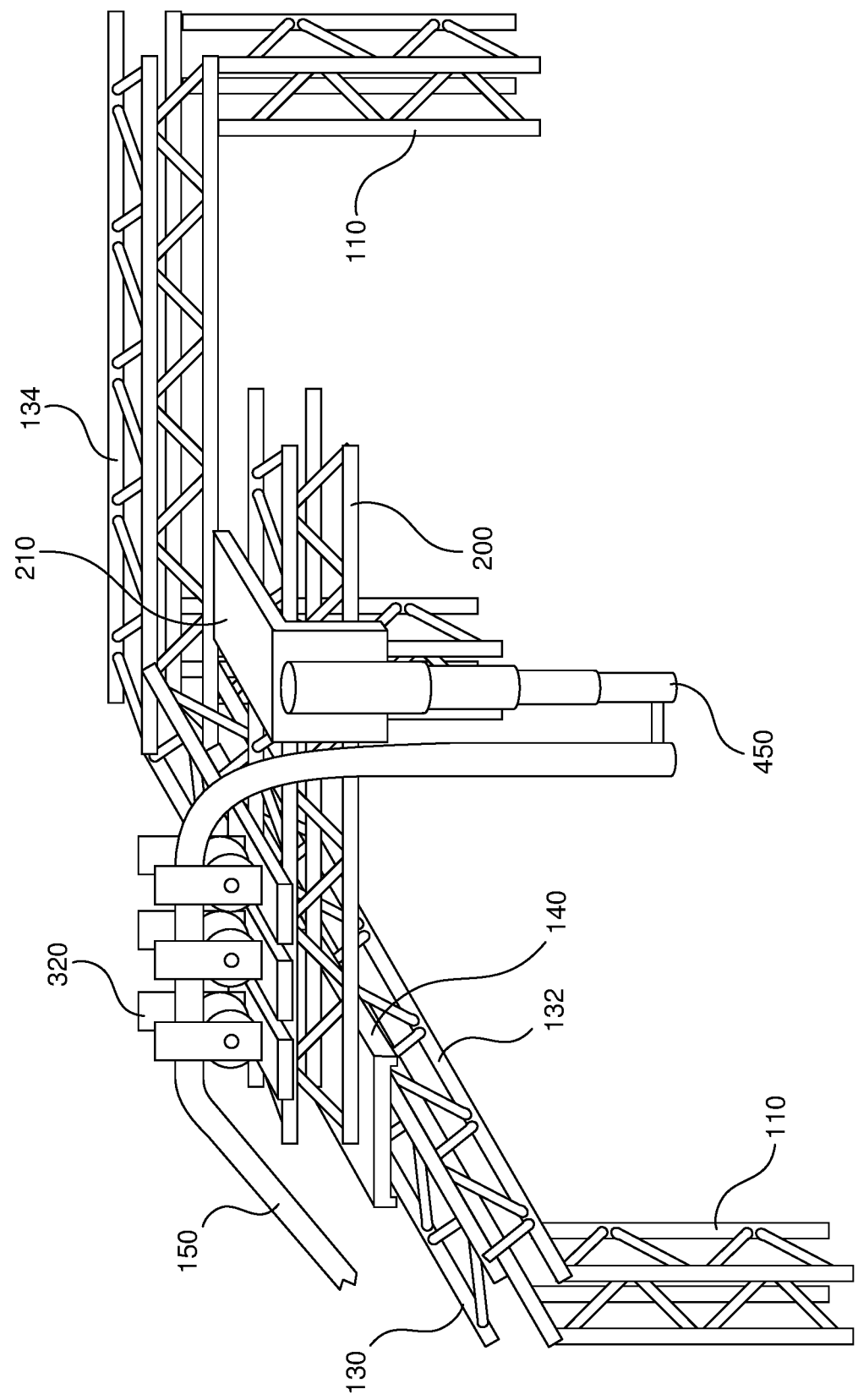
FIG. 1 is a perspective view of an example apparatus for additive manufacturing in accordance with the present disclosure.

The present disclosure describes apparatuses for additive manufacturing using cementitious materials such as concrete as a build material. These apparatuses can be used to print large and durables structures, such as houses, buildings, statues, monuments, walls, stairs, landscaping structures, and others. In some examples, a cementitious material can be delivered through a delivery hose to a printhead. The system can control the motion of the printhead in three dimensions to deposit the cementitious material at any location within a print volume. This additive manufacturing process can also be referred to as 3D printing. Some previous solutions for 3D printing buildings have involved large and heavy equipment for 3D printing. For example, some processes have used robotic arms to move a printhead in 3D space. Because concrete and other cementitious materials can be quite heavy, a large and heavy robotic arm is often used in such processes. Additionally, the equipment for 3D printing is often installed in a semi-permanent way at the build site, such as by securing the equipment to cement footings that are formed at the build site. The use of such large, heavy, and semi-permanent equipment can increase the cost of 3D printing large structures such as buildings.

In contrast, the apparatuses for additive manufacturing described herein can be very lightweight compared to other 3D printing equipment. The apparatuses can include a support structure made at least partially of trussing beams, which can provide good structural support while also being relatively lightweight. Trussing beams can be beams made up of structures such as poles, posts, rods, bars, struts, or other such structures. The trussing beams can include a significant amount of empty space within the beam structure, between the poles, posts, rods, bars, struts, etc. Therefore, a trussing beam can weigh much less than a solid beam of similar dimensions. In some examples, the trussing beams used in the apparatuses for additive manufacturing can include corner poles connected to one another by diagonals. The diagonals can be rods or struts that extend from one corner pole to another corner pole. In some examples, the trussing beams can have an overall geometry shaped like a rectangular prism. The rectangular prism can have surfaces made up of corner poles and diagonals instead of solid, continuous surfaces. The empty spaces between the corner poles and diagonals can allow wind to pass through the trussing beam. This can reduce shaking and movement of the apparatus due to wind, which could interfere with 3D printing accuracy. The trussing beams used in the apparatuses described herein can also be made from lightweight materials, such as aluminum, carbon fiber, fiberglass, or others. The support structure of the apparatuses, which include these trussing beams, can provide a balance between stability to maintain 3D printing accuracy and light weight to allow the apparatus to be easily assembled, disassembled, or moved if desired.

FIG. 1 shows an example apparatus for additive manufacturing. This example includes three legs 110 made of trussing beams. The legs support an upper frame 130 that includes an x-axis member 134, a y-axis member 132, and an x-axis gantry 200 coupled to the y-axis member and extending parallel to the x-axis member. The x-axis gantry slides along the y-axis member on a y-axis carriage 140. An x-axis carriage 210 is coupled to the x-axis gantry and can slide along the x-axis gantry. A telescoping z-axis member 450 is coupled to the x-axis carriage. A cementitious material delivery hose 150 has an outlet coupled to the z-axis member. Thus, the outlet can move along the z-axis as the z-axis member telescopes up and down. This example also includes a hose management system that includes trolley units 320. The trolley units are mounted on the x-axis gantry so that the trolley units can slide along the x-axis gantry. The delivery hose is supported by hose support wheels on the trolley units. These allow the delivery hose to move over the wheels with reduced frictional force. The hose support wheels hold the delivery hose above the x-axis gantry in this example.

The legs of the apparatus can support the upper frame at a target height. In some examples the target height can be stationary throughout the additive manufacturing process. In other words, while the apparatus is being used to 3D print a structure, the height of the upper frame can remain stationary or substantially stationary. This can include slight adjustments to the height if adjustments are made, for example, to level the platform. As explained above, the cementitious material delivery hose can have an outlet coupled to the z-axis member. The motion of the outlet in the z-axis direction (i.e., up and down) can be provided by extending and retracting the telescoping z-axis member. The up and down motion of the delivery hose outlet during printing is not provided by the legs or any other mechanism of moving the upper frame as a whole. Thus, the upper frame remains substantially stationary in the z-axis direction during printing. It is noted that some parts of the upper frame move the x-axis and y-axis direction, such as the x-axis gantry and the x-axis carriage.

Figure 2:
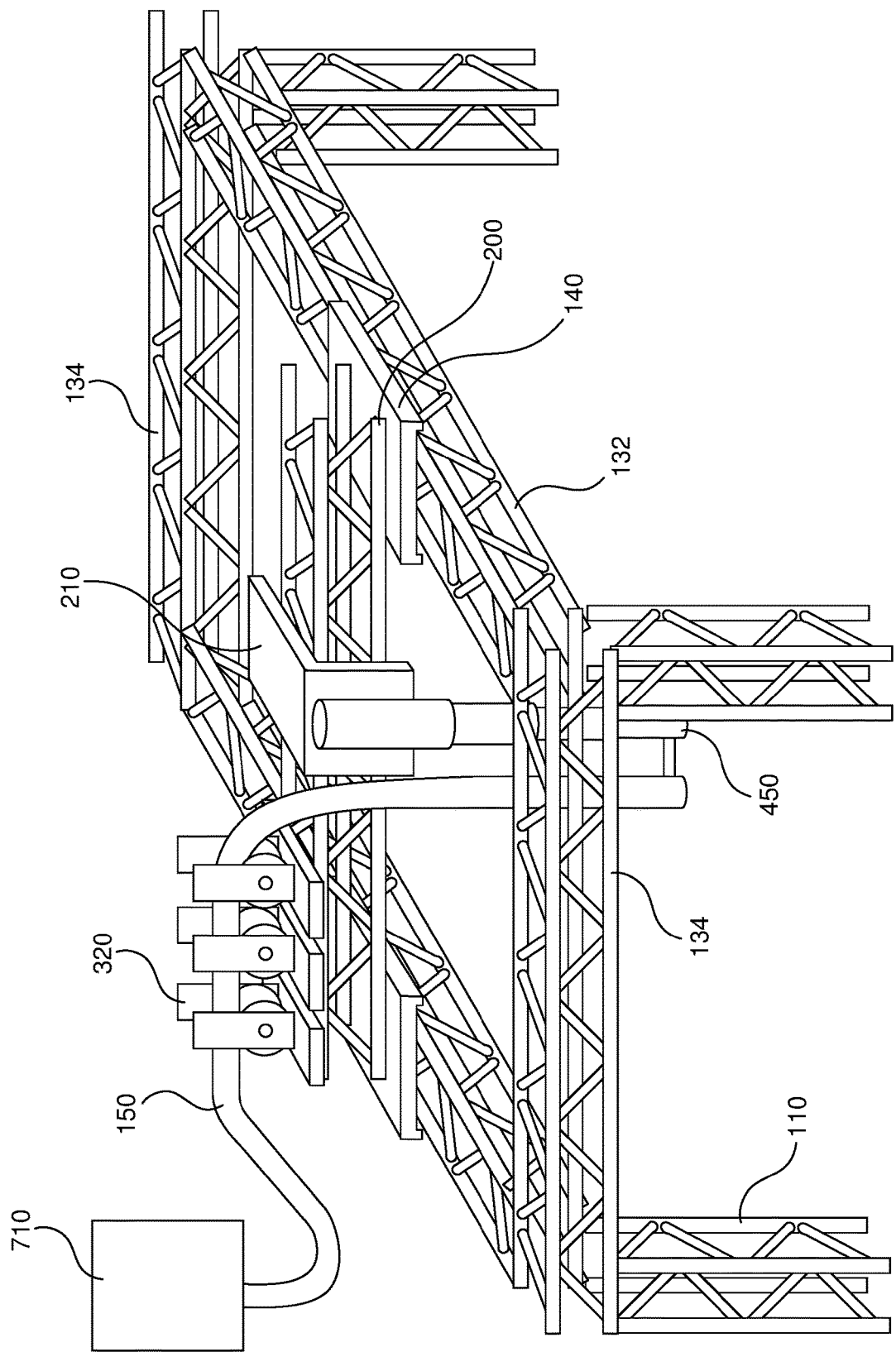
FIG. 2 is a perspective view of another example apparatus for additive manufacturing in accordance with the present disclosure.

Apparatuses for additive manufacturing can also include additional components. In some examples, the apparatus can include four or more legs. The upper frame also include more than one x-axis member and/or more than one y-axis member. FIG. 2 shows another example apparatus for additive manufacturing that includes four legs 110, two x-axis members 134, and two y-axis members 132. The x-axis gantry 200 can slide along the y-axis members on two y-axis carriages 140. As in the previous example, this apparatus also includes a telescoping z-axis member 450 coupled to an x-axis carriage 210. A delivery hose 150 is coupled to the z-axis member and is also supported by trolley units 320 as in the previous example. This figure also shows a cementitious material supply tank 710 connected to the delivery hose.

The apparatuses for additive manufacturing can be made in a variety of sizes. In some examples, the apparatus can be relatively small, such as about 8 feet by 8 feet in the x-axis and y-axis directions, and any desired height such as about 8 feet in height. This type of small example can be used to manufacture smaller objects such as statues, monuments, landscaping elements, and so on. The apparatuses can also be made very large, such as large enough to construct a multi-story building. In some examples, the apparatus can be up to 100 feet in length and width and height, or even more. In various examples, the x-axis members, y-axis members, and z-axis members can have a length from about 8 feet to about 100 feet, or from about 20 feet to about 100 feet, or from about 40 feet to about 100 feet, or from about 60 feet to about 100 feet.

Certain components of the apparatus can be moveable, with their motion powered by a motor. In some examples, the x-axis gantry can move along the y-axis member powered by a motor. The x-axis carriage can also move along the x-axis gantry powered by a motor. These components may be coupled to a motor in any suitable way to power their movement. In various examples, the x-axis gantry and the x-axis carriage can be directly coupled to a motor, or through a gear or gear train, or pulleys and cables, belts, timing belts, or other components. In some examples, the motors can be electric motors powered by the electrical grid, a generator, or batteries. In other examples, other power sources can be used.

Figure 3:
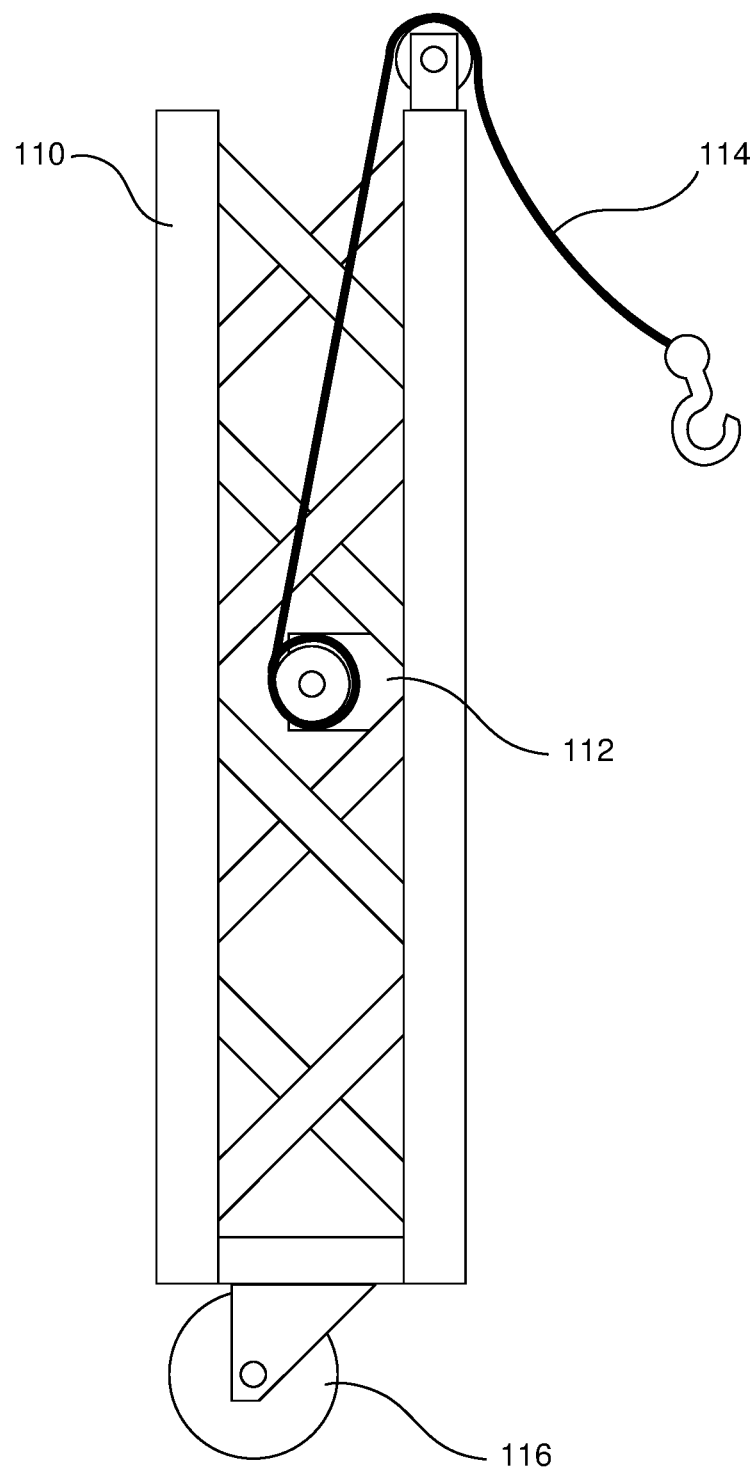
FIG. 3 is a side view of an example support leg with an integrated upper frame elevator in accordance with the present disclosure.

FIG. 3 shows an example leg 110 that includes an integrated upper frame elevator. The upper frame elevator includes a winch 112 that winds up a cable 114. The cable can be attached to a part of the upper frame and the cable can be wound up to pull the upper frame up to the top of the leg. The upper frame can then be secured in place, supported by the leg at a target height. The corners of the upper frame can be lifted using this type of elevator to make it easy to assemble the support structure of the apparatus for additive manufacturing. This example also includes a wheel 116 at the bottom of the leg. The legs of the apparatus can be wheeled in order to allow the apparatus to be mobile. For example, after the apparatus is used to a build a structure or a portion of a structure, the apparatus can be moved by rolling the entire apparatus on the wheels to a different location. The apparatus can then be used to build another structure of portion of a structure. The example leg shown in this figure can also be used on its own as a mobile upper frame elevator. For example, this mobile elevator can be moved to a corner of the apparatus and then used to lift the corner of the upper frame. The upper frame can then be secured to a separate leg, and the mobile elevator can be moved to another corner to lift the next corner, and so on.

Figure 4:
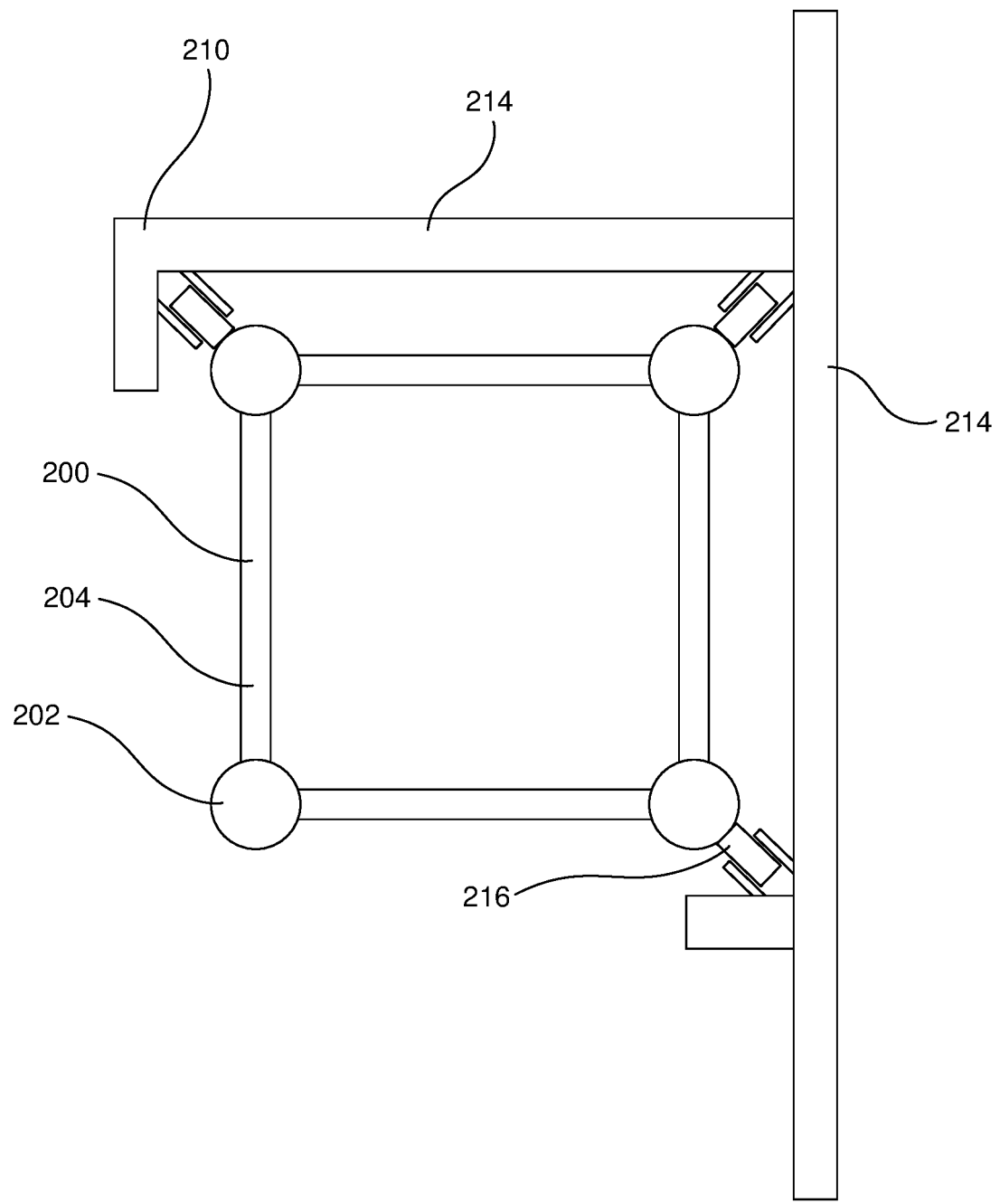
FIG. 4 is a front view of an example x-axis carriage on an x-axis gantry in accordance with the present disclosure.

The various moving components of the apparatus can be coupled using wheels, rails, sliders, bearings, or other such components that allow for a sliding motion. One example x-axis carriage 210 is shown from a front view in FIG. 4. More particularly, this view shows an x-axis gantry 200 from the front, i.e., and end-on view of the gantry beam with the x-axis carriage coupled to the gantry beam. The x-axis gantry includes a trussing beam made up of rounded corner poles 202 with diagonals 204 extending between the corner poles. The x-axis carriage includes a vertical plate 212 and a horizontal plate 214 with wheels 216 connected thereto. The wheels in this example are angled at an angle of about 45° and positioned to roll along the rounded corner poles of the x-axis gantry. In other examples, the angle of the wheels can be from 30° to 60°. In various examples, the x-axis carrier can include wheels that roll on at least the top two corner poles of the x-axis gantry. The telescoping z-axis member (not shown in this figure) can be coupled to the vertical plate in some examples.

Figure 5:
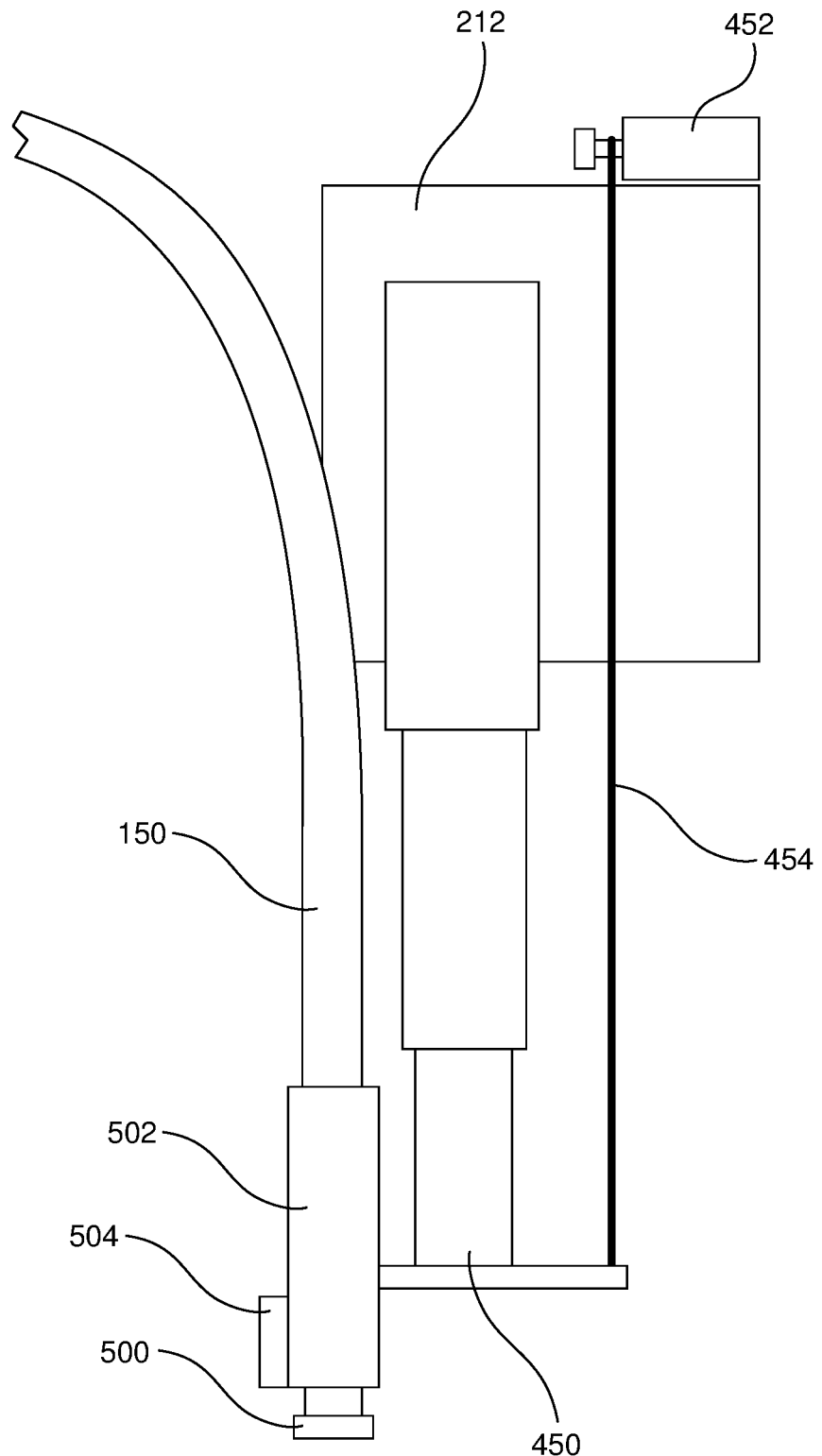
FIG. 5 is a side view of an example telescoping z-axis member in accordance with the present disclosure.

FIG. 5 shows an example side view of the vertical plate 212 of the x-axis carriage with the telescoping z-axis member 450 coupled thereto. The z-axis member can include at least three telescoping sections, which can be nesting tubes of progressively smaller width. The z-axis member can be designed so that the z-axis member does not extend vertically above the x-axis gantry, or extends only a short distance such as 4 feet or less. This can be true even when the z-axis member is fully retracted to its shortest length and highest printing position. Some other designs for large-scale 3D printers may include a z-axis member that does not telescope. When such a z-axis member moves upward, the top end of the z-axis member can extend far above the rest of the 3D printing system. This increases the overall volume occupied by the system while printing. In comparison, the apparatuses described herein can be more compact because the telescoping z-axis member does not extend above the x-axis gantry, or extends only a short distance.

FIG. 5 also shows a motor 452 on the vertical plate 212. The motor can extend and retract a cable 454 that is coupled to the bottom or distal end of the telescoping z-axis member 450. The vertical position of the bottom or distal end of the z-axis can be determined by the length of cable that is unwound by the motor. When the cable is unwound, gravity can pull the telescoping z-axis down as far as the cable will allow. The bottom end of the z-axis member is also coupled to a printhead 502 that includes a printing nozzle 500. The printhead is coupled to the outlet of the delivery hose 150. In this example, the printhead also includes a laser distance sensor 504 that can be used to measure a distance between the printhead and a surface on which cementitious material is to be printed.

Figure 6:
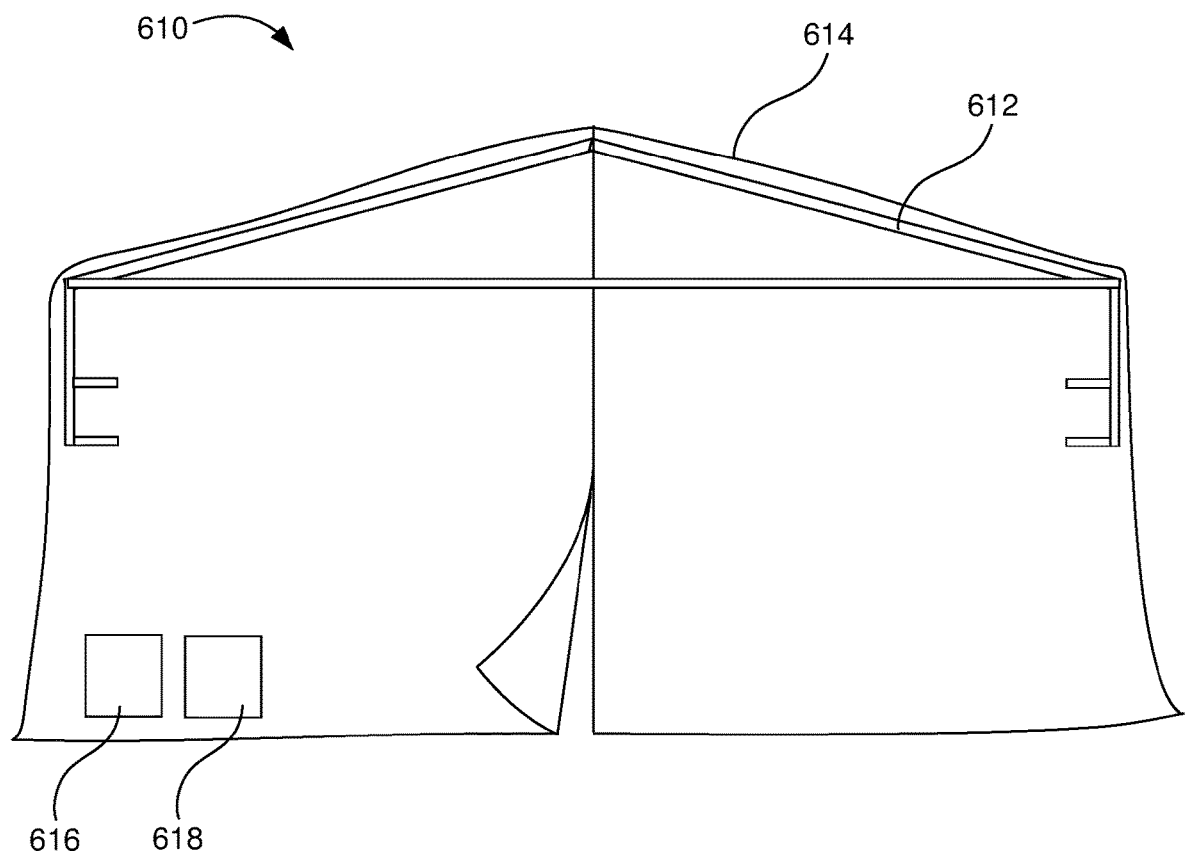
FIG. 6 is a side view of an example enclosure for an apparatus for additive manufacturing in accordance with the present disclosure.

In further examples, the apparatus can include an enclosure that can cover the legs and upper frame of the apparatus. The structure being printed by the apparatus can be at least partially enclosed by the enclosure. In some examples, this can be useful for controlling environmental conditions for 3D printing, such as temperature, humidity, wind, and so on. Many cementitious materials can have curing properties that depend on temperature and humidity in particular. FIG. 6 shows an example enclosure 610 shaped as a tent that can cover the legs and upper frame of the apparatus. The tent includes support bars 612 and a covering 614 that can be made of flexible material such as a plastic sheet, fabric, etc. In some examples, the tent can include support bars that extend to the ground so that the tent can be free standing. However, in the example shown in FIG. 6, the support bars are designed to attach to the sides of the legs or upper frame of the apparatus. Thus, the apparatus itself can provide some structure support for the tent. As explained above, the telescoping z-axis member may not extend above the x-axis gantry or may extend only a short distance above the x-axis gantry. This can allow for an enclosure that does have much space above the x-axis gantry. The height and width of the enclosure can be sufficient to allow the moving components of the apparatus to move without restriction by the enclosure. This example also includes an environment sensor 616 and an environment control element 618 within the enclosure. The environment control element can include a heater, an AC cooler, evaporative cooler, a humidifier, a dehumidifier, a water mister, a vent, or another type of element to control environmental conditions within the enclosure. The environment sensor can include a sensor for measuring any environmental condition, such as a thermometer, a humidity sensor, or others. In some examples, the environment sensor and environment control element can be connected to a process controller to maintain environmental conditions such as temperature and humidity at a desired level. In some cases, an ambient temperature within the enclosure can be maintained at from 65 to 70° F. As a result, when using ambient temperature sensors, the batch mixture can be maintained at a relatively higher temperature than outside temperatures (during cold weather) such that faster curing time is achieved while also reducing use of expensive additives.

The components of apparatuses for additive manufacturing described above can be combined in any desired combination in various embodiments. Additional components and features of apparatuses for additive manufacturing are described below. In some examples, the additive manufacturing system comprises: a support structure; an y-axis member mounted to the support structure; an x-axis member mounted to the support structure; a z-axis member mounted to the support structure; a hose management apparatus mounted to the support structure; a supply tank containing a supply of a material to be deposited; a delivery hose connected to the hose management apparatus and to the supply tank; a printhead, that may be rotatable or repositionable, connected to the delivery hose where the printhead being configured to deposit the supply of material to be deposited; and a control system for controlling the movement and location of the printhead in three dimensional space. An additive manufacturing system is disclosed wherein the additive manufacturing system comprises: a support structure; a y-axis member mounted to the support structure; a x-axis member mounted to the support structure; a z-axis member mounted to the support structure; a hose management apparatus mounted to the support structure; a supply tank containing a supply of a material to be deposited; a delivery hose connected to the hose management apparatus and to the supply tank; a repositionable and rotatable printhead connected to the delivery hose with the printhead being configured to deposit the supply of material to be deposited; and a control system for controlling the movement and location of the printhead in three-dimensional space.

The printhead may be a hose coupled to a nozzle, which may be referred to as an outlet, that may be configured to extrude cementitious material. The printhead may be mounted on an extendable or telescoping z-axis member. When the z-axis member may be extended in the vertical direction, then the printhead, which may be coupled to the outer surface of the z-axis member, may also be extended in the vertical direction.

For purposes of this disclosure, a motor includes the connectors or couplers useful for coupling a motor to one or more pulleys.

A z-axis member may be a z-axis beam that extends along the z-axis towards the ceiling and towards ground. A z-axis member may include one or more rails or one more tracks upon which one or more carriages may be slid upon. An x-axis member may include one or more rails or one more tracks upon which one or more carriages may be slid upon. An x-axis member may be an x-axis beam that extends along the x-axis which may be horizontal. A y-axis member may be a y-axis beam that extends orthogonally with respect to the x-axis while simultaneously extending orthogonally with respect to the z-axis. A y-axis member may include one or more rails or one more tracks upon which one or more carriages may be slid upon.

A z-axis assembly may include a z-axis member that may be coupled or communicatively coupled to one or more of one or more motors, one or more gears, one or more couplers, one or more pulleys, one or more gear trains, one or more timing bands, and one or more power sources, and one or more rails upon.

An x-axis assembly may include an x-axis member that may be coupled or communicatively coupled to one or more of one or more motors, one or more gears, one or more couplers, one or more pulleys, one or more gear trains, one or more timing bands, and one or more power sources. An x-axis gantry assembly may be an x-axis assembly that may be disposed between a first x-axis assembly and a second x-axis assembly, such that the x-axis gantry assembly may have a first end and a second end wherein the first end may be moveably coupled to a first y-axis assembly and the second end may be moveably coupled to a second y-axis assembly, such that the x-axis gantry assembly may slideably move along the first y-axis assembly and the second y-axis assembly while moving closer to the first x-axis assembly and simultaneously moving further from the second-x axis assembly or while moving further from the first x-axis assembly and simultaneously moving towards from the second-x axis assembly A y-axis assembly may include a y-axis member that may be coupled or communicatively coupled to one or more of one or more motors, one or more gears, one or more couplers, one or more pulleys, one or more gear trains, one or more timing bands, and one or more power sources.

The z-axis member may also be moved vertically away, by a z-axis assembly, from a printing surface; when the z-axis member has telescoping units and is configured to telescope such that the telescoping units of a z-axis member may be retracted such that the length of the z-axis member may be decreased; the inner surface of each telescoping unit may have one or more ridges.

In some embodiments, the z-axis assembly may be coupled to an x-axis gantry assembly such that the z-axis assembly may include one or more rails or one or more tracks upon which the other component of the z-axis assembly may slideably move in the vertical direction; the z-axis beam, z-axis assembly, or the z-axis assembly other than the one or more rails or one or more tracks upon which the z-axis assembly may slideably move may be configured to move vertically up-and-down to print both more closely to the rebar and to allow the x-axis gantry, which may be disposed upon tracks at the top of the printer structure's exoskeleton, to clear tall objects.

In further embodiments of the present invention, they-beam gantry may have a fixed height, and in some embodiments, they-beam gantry may be configured to stay at a fixed vertical position so that they-beam gantry, in some embodiments, may not be moved vertically upward as the layers being printed increase in vertical position.

In still further embodiments of the present invention, the z-axis member may be positioned on rails to move vertically in conjunction with a z-axis carriage which also may ride a separate set of horizontal rails on the x-axis beam. The gantry may move perpendicularly along a set of rails on the exoskeletal structure of the additive manufacturing system. In other examples, the gantry can move on the exoskeletal structure without the use of such rails.

An additive manufacturing system is disclosed, the additive manufacturing system may also be called a 3D printer or large scale 3D printer. The additive manufacturing system may receive various materials and may be a 3D Printer capable of printing with many types of materials using software and supporting components that work in unison including a pre-mixer, water distribution mixer, pumping system, hose, and may use a stationary or 360 degree rotating head for large and small scale construction with a myriad of different mix formulas, from concrete, foamcrete, hempcrete, geopolymer, epoxy, and resin and other cementitious material.

Some examples of the additive manufacturing system may have a substantially narrow z-axis member. The z-axis member may be configured to deliver via the hose, composition material such as concrete; the z-axis member may be narrow enough to print around vertical rebar, tied-off rebar, and plumbing or other elements, and which may use a modular system for supplying concrete, additives to alter the qualities of the concrete, or other materials to the printhead.

The z-axis member may be less than 20 feet in diameter and may be relatively narrow, such as a foot or less in diameter, or no more than 6 inches in any horizontal dimensions, so that the printhead may print material next to structures such as rebar or plumbing. The z-axis member may be less than 100 feet in length or may be greater than 60 feet in length. Due to the positioning of the gantry, which may also be referred to as an x-axis member, which may be coupled to the z-axis member, the gantry may clear these obstructions in the foundation or other formed elements that may extend vertically. The printhead may be a hose coupled to a nozzle, which may be referred to as an outlet, that may be configured to extrude or "print" cementitious material. The printhead may be mounted on an extendable or telescoping z-axis member.

When the z-axis member is extended in the vertical direction, then the printhead, which may be coupled to the outer surface of the z-axis member, may also be extended in the vertical direction. The z-axis member may also be moved vertically away from a printing surface; when the z-axis member may be configured to telescope, then the telescoping units of the z-axis member may be un-extended such that the length of the z-axis member may be decreased. Any reference to a member may also be substituted with an assembly such that some references to a z-axis member may refer to a z-axis assembly, some references to an x-axis member may refer to an x-axis assembly, and some references to a y-axis member may refer to a y-axis assembly.

The gantry (which may be termed the x-axis gantry and may be referred to as an x-axis member or x-axis beam), the z-axis assembly, or the z-axis beam, may be located on a series of tracks that may be located to move vertically up-and-down to print both more closely to the rebar and to allow the gantry, which is on tracks at the top of the printer structure's exoskeleton, to clear tall objects. In some embodiments, the y-beams may have a fixed height, and in some embodiments, the y-beams may be configured to stay at a fixed vertical position so that the y-beam, in some embodiments of the present invention, may not be moved vertically upward as the layers being printed increase in vertical position.

The z-axis member may have rails to move vertically along a z-axis carriage which also may ride a separate set of horizontal rails on the gantry. The gantry may move perpendicularly along a set of rails, such as a third set of rails, on the exoskeletal structure of the printer.

In order to accomplish this movement of the z-axis member while printing, a hose management apparatus may be used to facilitate substantially smooth movement of the hose. The additive manufacturing system may use a hose of fixed length which may be directly coupled to the printhead nozzle. A hose management apparatus may include a hose detachably coupled to a trolley system; in order to move in-and-out of the printing space on the z-axis, and in some embodiments, the hose may sit above the x-axis gantry or on the x-axis gantry so as to avoid colliding with objects in the printing space. The printing space refers to a 3D space upon which cementitious material may be layered and through which the print head may be transported.

The hose management apparatus may be used to prevent the hose from bumping into the rebar, plumbing, or other obstacles, and to not hit the printed structure itself. The hose may be connected to the lower end of the z-axis member, and then may extend across an expandable and contractible trolley system on the top surface of the gantry. This trolley system may have a plurality of wheeled units, which may be referred to as trolley units, on the rail system mounted on the gantry.

The trolley units, which may be wheeled units, may have a bearing block on the bottom of each trolley unit to ride the rail, a hose support wheel with guide fins may be disposed on either side of the top of the trolley unit; the hose may travel along the upper surface of the trolley units. A set of spacers, which may be made of any material, may be positioned to front or the back of a trolley unit to prevent the hose support wheels from contacting each other and locking up. The trolley units may be attached to each other in sequence by cables with one end attached to the z-axis carriage and the other end may be attached to the end of the x-axis gantry where the hose may be frictionally coupled to the frame of the printer.

A hose feeder system, which may be a subsystem of the hose management apparatus may be located at within 100 meters of the location where the hose is frictionally coupled to the frame of the printer; the subsystem of the hose management apparatus may be configured to further reduce the shaking of the printer and to further reduce strain on the x-axis gantry motor as the hose coils and uncoils on the ground. The hose feeder system may lift and lower (or push and pull) a hose off the ground. The hose feeder system may include a number of pulleys or a number of motors; and the pulleys or motors, which may be coupled to a plurality of gears, may actuate the movement of the hose feeder or motor-driven hose simultaneously with the movement of an x-axis gantry motor; the movement of the motor of pulleys may be at a steady rate towards or away from the printer to reduce shaking, vibration, and whipping of the hose.

The hose management apparatus may be useful for a substantially lightweight additive manufacturing system. The support structure of the additive manufacturing system may be aluminum trussing beams or other lightweight materials. In some cases, lightweight materials are used for the support structure, which may facilitate easier transportation and set-up/teardown, and also may reduce damage. Trussing beams may allow wind to pass through the structure without shaking or moving the printer structure, which may impact the printhead's path. The use of lightweight trussing beams is counterintuitive, as vibration in the 3D printer increases, additional features to mitigate this vibration may be called for. 3D printers in the prior art often include heavy footings to increase stability, but the present apparatus foregoes those in favor of portability of the 3D printer apparatus.

Additionally, aluminum trussing, which has rounded poles in each corner of a single beam, may allow for the gantry to forgo rails and instead utilize a wheeled carriage that has wheels which interact at a 30 to 60 degree angle, or about a 45-degree angle with those rounded corner poles of a single aluminum truss beam on each of the top two corners. The connection pins for the trussing, when coupled with the trussing, may extrude a substantially small distance from the trussing; the connections of the trussing may be machined trussing that may allow smooth movement of the gantry's carriage across the full-length of the exoskeletal structure. Trussing made of other lightweight materials is also usable, particularly carbon-fiber trussing, fiberglass, or anything lightweight and rust-resistant.

The material mixing method may include the use of a formula pre-mixer, vertical elevator, water distribution mixer, second vertical elevator, and wet pump, which may be the pump which is coupled to the hose with quick disconnects. The water additive hopper is capable of adding water in precise amounts or manually by a worker, and the pump is any suitable pump, such as a rotor-stator or squeeze pump. This method of separate machines may allow for modularity and quick swapping of components, though a single device coupling all these elements together is also part of our intended device patent, wherein the parts are still swappable.

A z-axis member may be a z-axis member; the z-axis member may be comprised of telescoping sections; alternatively, the z-axis member may be of a fixed length, and a motor system may be used to raise or lower vertically the z-axis member. In some embodiments, the z-axis member may be coupled to a y-axis member or an x-axis member; the y-axis member of the x-axis member may be coupled to a motor and a set of gears and timing belts.

In at least some embodiments of the present invention, the system may include one or more y-axis rails, each of which may include one or more linear bearing rails coupled to one or more bearing boxes. Additionally, in some alternative embodiments of the present invention, the system may include one or more x-axis rails. In some embodiments, the system may include y-axis rails and x-axis rails. In some embodiments, the system may include a rail-less track system. The y-axis member may include a rail-less track, or the x-axis member may include a rail-less track.

An angled view of a single hose management trolley unit is depicted. For purposes of this disclosure, the references to a y-axis and an x-axis may be switched such that the x-axis may refer to the y-axis and what is originally referred to as the y-axis may refer to the y-axis.

A wheeled unit in the hose management system may also be called a trolley unit, and an x-axis member may be referred to as an x-axis gantry For purposes of this disclosure, a "printhead assembly" may include at least one printhead, nozzle and one or more of at least one coupler, at least one valve, and at least one motor. Some embodiments of an exoskeleton may include one or more legs, which may be a support structure for the exoskeleton, which may be located at the perimeter of the exoskeleton, and which may include truss structures for support. A hose management system may sit on top of the exoskeleton, such as on the x-axis gantry. The hose management system may be configured to organize the position of hoses during operation of the printer so as to avoid or decrease the entanglement of hoses. Cementitious material or printable material may be delivered through one or more hose; additionally, a nozzle may be coupled to an end of the hose to provide an outlet or controllable outlet through which cementitious material or printable material may be delivered. A controller may control processing hardware and circuitry for automatically managing the printer. Some embodiments of the controller may be configured to use machine learning algorithms to speed up the printing process and to control the mixing of cementitious materials by the batching system. In some embodiments, a plurality of hoses are used to deliver cementitious material.

Torque may be created by some configurations of a pulley system assembly that includes one or more bands or timing bands; at least one end of the x-axis gantry may have torque and may allow a band to travel through a pulley that is connected to the timing belt and so the bands are just connecting the motor's axle line to the timing belt that runs the length; a timing belt may be connected to the pulley; a pulley motor assembly may include a pulley operably coupled to a motor; the pulley motor assembly may be detachably coupled to a timing belt; when the motor of the pulley motor assembly rotates, the motor may then cause an assembly of one or more gears to rotate such that the timing belt of a vertical beam, which may be coupled to the one or more gears, is moved to a new timing belt vertical position; and a stepper motor may be used to track the movement of a band or timing belt, which may be based on the number of full 360-degree rotations or the number of partial rotations tracked by a stepper motor or determined by the sensing of a proximity sensor target of a proximity sensor; the stepper motor may calculate how many times a gear with teeth has been rotated; thereby measuring directly or indirectly the distance that a portion of a timing belt or a portion of a band has traveled. In some embodiments, a proximity sensor target is located on a timing belt, and when the proximity sensor target passes within sensing range of a proximity sensor, then the detection of the proximity sensor allows the automatic controller to determine the location of the timing belt, which may be useful to calculating the location of component of the system, such as the x coordinate, y coordinate, or z coordinate location of the z-axis member or the location of the z-axis member with respect to the vertical plate or to a location on the x-axis gantry.

In some embodiments, each beam may be associated with one or more timing belts, such as four timing belts. The timing belts may run the length of the beam; and a motor may be associated with each of the timing belts; and on the horizontal beam a horizontal carriage may move along the horizontal position; in some embodiments, the z-beam is sufficiently narrow so that it may be positioned in between two or more rebars; in some embodiments the z-beam is four inches by four inches; the trussing may be 12-inches in length or width. The gantry may be bowed by the addition of spacers, washers, or other flanges on the ends such that the middle portion of the gantry is at a higher position than the ends.

Figure 7:
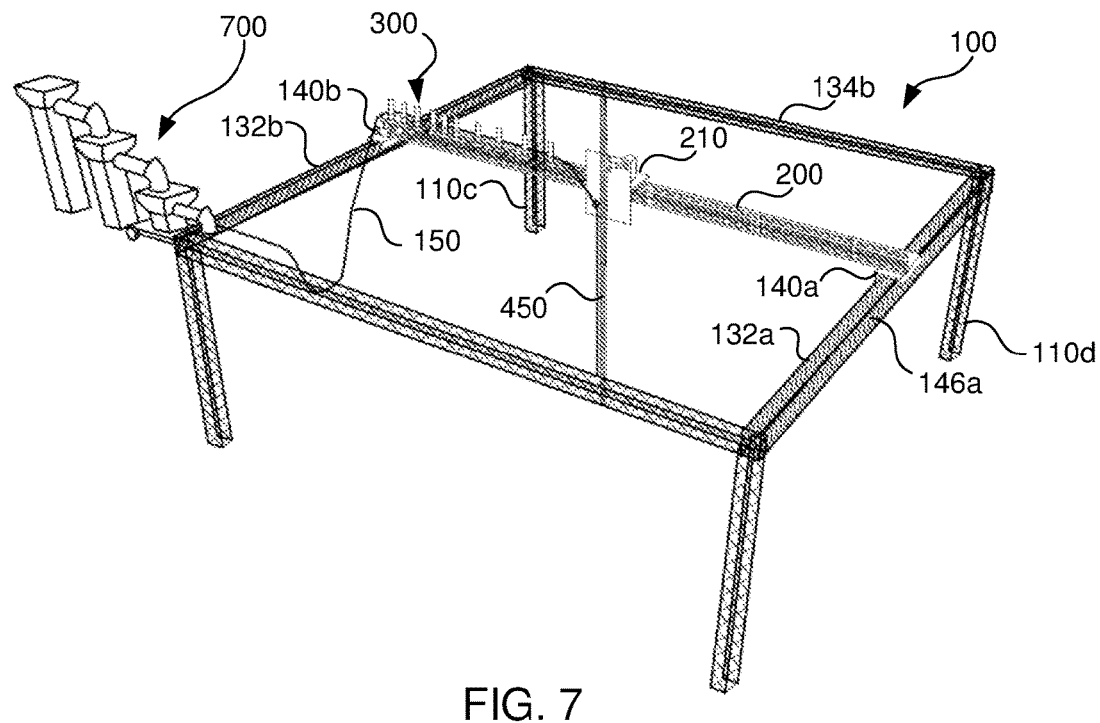
FIG. 7 is a perspective view of an example additive manufacturing apparatus in accordance with the present disclosure.

Referring to FIG. 7, some embodiments of an exoskeleton 100 are depicted. Some embodiments of printing material generation system 700 are depicted. Printing material generation system 700 may incorporate one or more pipes, dispensers, hoppers, motors, pumps, or nozzles 500 to facilitate the automated transfer of cementitious material or printable material for the printer, which may increase the rate at which printing may occur. Legs 110a, 110b, 110c, and 110d may provide support for the upper frame exoskeleton 100. A first y-axis member 132a may be positioned substantially parallel to a second y-axis member 132b and a first x-axis member 134a may be aligned substantially parallel to a second x-axis member 134b. In one example, an outflow outlet of printing material generation system 700 may operably deliver cementitious material or printable material via hose 150. A hose support system 300 can provide moveable support to the delivery hose 150. A first y-axis carriage 140a may be coupled to one or more motors and may include a set of pulleys and may include at least one toothed-pulley that may be coupled to a timing belt 146a that may be stretched along a corresponding y-axis beam; the one or more motors a second y-axis carriage 140b may be configured like the first y-axis carriage 140a and may be coupled to an x-beam that is parallel to the first y-axis beam. X-axis gantry 200 may have a first x-axis carriage 210 operably and slidably coupled to the x-axis gantry 200 that may move along x-axis gantry 200. Z-axis member 450 may be substantially vertically aligned and may be coupled to hose 150. Although not shown in FIG. 6, z-axis member 450 may be telescoping.

Figure 8:
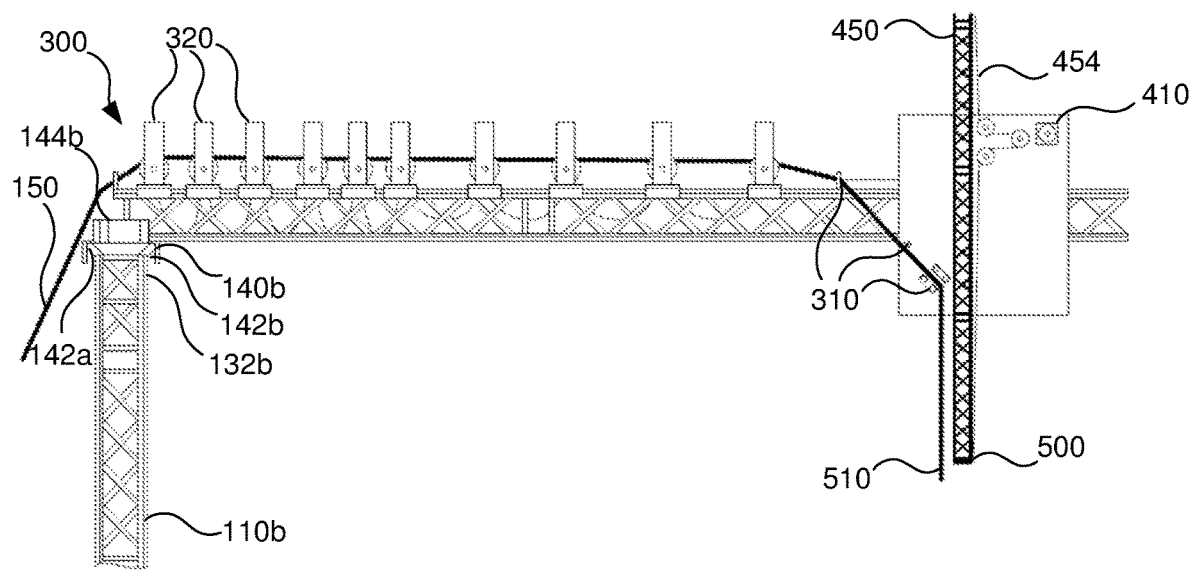
FIG. 8 is a side view of an example additive manufacturing apparatus in accordance with the present disclosure.

Referring to FIG. 8 a portion of some embodiments of exoskeleton 100 are depicted. Some embodiments of leg 110b are depicted. Referring now to FIG. 8, a side of the apparatus is depicted. The trussing of the apparatus may consist of four long poles that are situated to create a rectangular prism. The trussing may be made from aluminum. The delivery hose 150 may be a hose that may deliver a material, such as a cementitious material like concrete, that may be in a variety of colors or properties. Various embodiments of the present invention may be used to transport and deposit any liquid or semiliquid material. In this case, the hose support system 300 can be used to support the delivery hose 150 during use. The delivery hose 150 may be elongated along the x-axis. Delivery hose 150 may also be aligned to the center of a plurality of trolley units 320. Flange 310 may be configured to assist the hose with the 90 degree bend; flange 310 may be aligned next to 4 wheels that are facing inward so that a hose may pass through flange 310 and along motor pulley 340 for pulling a hose; in some embodiments, a motor may cause one or more pulleys to rotate, the pulleys being in frictional contact with the hose such that the rotation of the pulleys cause the hose to move. In other embodiments, the printhead provides all of the pulling force on the hose. In some embodiments, trussing is typically substantially light-weight, when compared to a flat panel that does not have gaps; in some embodiments the trussing may have gaps between the structural support bars forming the trussing, which may allow for wind to travel through the structural support bars. Each individual trolley unit may be coupled by a leash 330 to an adjacent trolley unit; the function of the leash is to allow the coordinate movement of a trolley, such that when a first trolley unit is moved laterally along the x-axis gantry, then the adjacent trolley, which is coupled by a leash to the first trolley unit, may then be dragged by the first trolley unit via the leash. The lengths of a leash are such that when the trolley units are evenly spaced along the x-axis gantry, than the total length of all the leashes, when taut, is at least as great as the total distance between the trolley units. As shown in the figures and in some embodiments, a leash coupling two adjacent trolley units forms a U-shape when two adjacent trolley units are relatively close to each other, and when the two adjacent trolley units are relatively far from each other, then the leash coupling the two adjacent trolley units is linearly taut.

In some embodiments, one or more carriages are frictionally coupled, via one or more wheels, to rails or beams. In some embodiments, a carriage may have a first set of wheels and a second set of the wheels; the first set of wheels may be substantially parallel to the second set of wheels; each set of wheels may have two wheels, and in some embodiments, each set of wheels may have four or more wheels. Each of the wheels may be aligned at an angle; in some embodiments, the wheels may be aligned at an angle, the angle may be between 1 degree and 89 degrees. In some embodiments, the angle of the wheels may be 45 degrees or between 29 degrees to 61 degrees. In some embodiments, the carriage has four wheels on each side. The center carriage on the gantry may have a vertical plate 510 that extends above and below the gantry because on the bottom there may be a plurality of wheels such as four wheels. The bottom of the trussing of the x-axis member may be coupled to one or more wheels, and above the central trussing beam, there may be a series of one or more wheels, and on the opposing side of the gantry there may also be one or more wheels, such that the bottom edge of the gantry and the top two edges of the gantry may be coupled to a plurality of wheels.

Three or more pulleys may form a pulley system or a pulley subsystem; some embodiments of a pulley system or a pulley subsystem are arranged such that a pulley is located at each of vertices of a reference triangle, wherein in some embodiments two of the three pulleys are inner pulleys located nearer to the z-axis member than a first outer puller, wherein a timing belt 454 may traverse across the inner side and upper side of a first inner pulley and around the outer side of the outer pulley and then over to the underside and inner side of a second inner pulley driven by z-axis motor 410, such that the torque of the timing belt is increased compared to an arrangement of a timing belt circulating around two pulleys. Proximity sensors, which sense via perceived distance or mechanical contact, may be located on the timing belt, on the z-axis carriage, or on the z-axis member, such that the proximity sensors may sense the presence of a carriage, telescoping unit, or timing belt, such that the proximity sensors may be provide usable information about the position of the timing belt and thus the printhead in 3D space.

The plurality of trolley units may each hold a rotatable wheel that may allow the delivery hose to rest on the trolley units. The delivery hose may also be aligned to the center of the trolley units, which may be coupled with the x-axis gantry. The trolley units may also be aligned along the x-axis gantry of the exoskeletal support system; each of the trolley units may move along the x-axis beam; and in some embodiments the trolley units may move separately, such that the distance between each of the trolley units may vary as the delivery hose moves along the upper surface of the trolley units. Trolley unit assembly refers to all of the trolley units.

Figure 9:
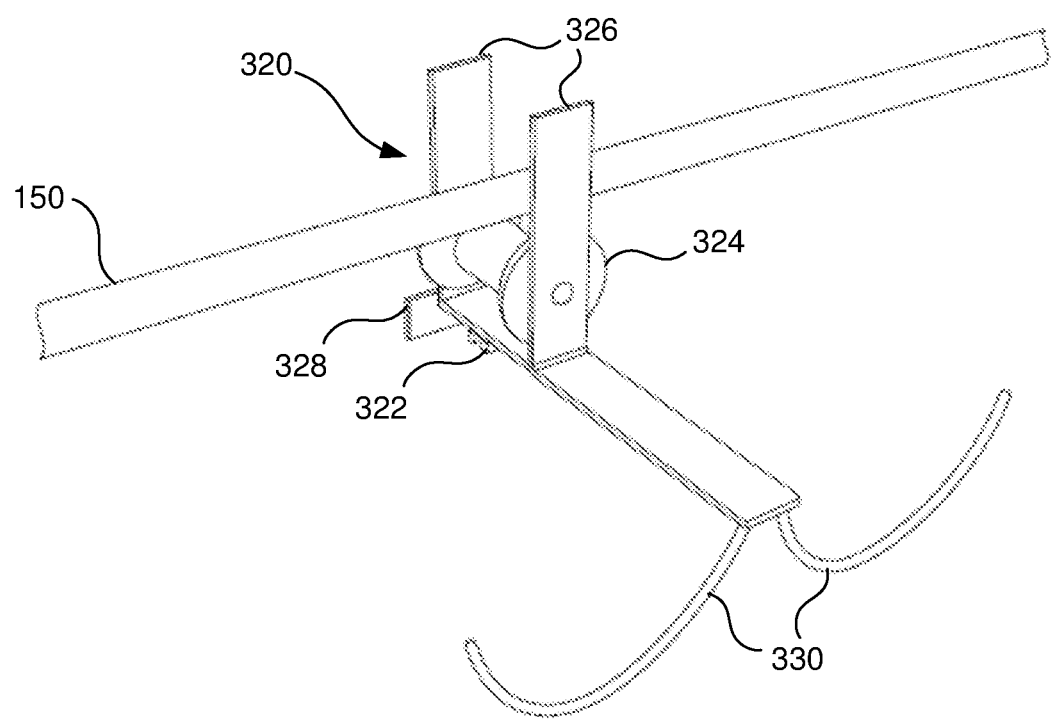
FIG. 9 is a perspective view of an example trolley unit in accordance with the present disclosure.

As shown in FIG. 9 a first guide fin 326 and a second guide fin 326 may be aligned with the hose support wheel 324 so as to provide a barrier on each side of the delivery hose 150. A plurality of guide fins may form a channel for the hose. Hose support wheel 324 may provide a rotatable surface for the delivery hose 150 such that movement of the delivery hose 150 may cause the hose support wheel 324 to rotate, thereby reducing the frictional force acting to hinder the movement of a hose that is being pulled across the hose support wheel 324.

Spacer 328 may be a flange that extends beyond the lateral width of the hose support wheel 324, thereby increasing the space between a first support wheel 324 of a first trolley unit and a second support wheel 324 of a second trolley unit. Each trolley unit may have a spacer on any side that is facing a trolley unit; for example, when there are three trolley units aligned linearly such that a first trolley unit to the left side is adjacent to a second trolley unit located in the middle of the three trolley units and is adjacent to a third trolley unit, then the middle trolley unit has a spacer on a first end and a spacer on a second end, such that the spacer on the first end functions as a barrier between the first trolley unit and the second trolley unit located in the middle of the three trolley units, such that the spacer on the second end of the middle trolley unit functions as a barrier between the middle trolley unit and the third trolley unit. In these embodiments, the number of trolley units aligned on the x-axis gantry can be between three trolley units and three hundred trolley units.

A wheel frame, which may have an I-shaped end surface, and another wheel frame, which may have an I-shaped end surface, may surround the wheels. An x-axis gantry may be coupled to a first set of wheels and a second set of wheels; the wheel frames may be coupled to the vertical plate. The vertical plate may be coupled to one or more sliding blocks; in some embodiments, the vertical plate is coupled to a first sliding blocks set comprising a plurality of sliding blocks which are linearly aligned with each other and collectively parallel to a second sliding blocks set of sliding blocks which are linearly aligned with each other and collectively parallel to the first set of sliding blocks. A first linear guide rail may be mounted to the z-beam while also being slidably coupled to the first sliding blocks set. A second linear guide rail may be mounted to the z-beam while also being slidably coupled to the second sliding blocks set. Sliding blocks may have a central surface comprising a plurality of bearings such that, in some embodiments, the first sliding blocks set and the second sliding blocks set are kept at a fixed vertical position while the linear guide rails are slid across the bearings of the slide blocks, thereby actuating a change in vertical position of the z-beam, with respect to the ground. In some embodiments, the z-beam is moved by a motor system comprising at least one motor (such as a stepper motor), one or more pulleys (such as at least 3 or five pulleys), and one or more timing belts. In some embodiments, the z-beam is kept at a level vertical position while a telescoping unit coupled to the z-beam extends or retracts, thereby allowing for the deposition of cementitious material at various vertical heights. In some embodiments, a control system controls or synchronizes the movement of the z-beam by controlling the number of rotations of at least one motor of a motor system comprising the least one motor (such as a stepper motor), one or more pulleys (such as at least 3 pulleys), and one or more timing belts, while at the same time controlling the telescoping motion of a telescoping unit coupled to the z-beam, wherein the telescoping unit may be coupled to a hose and nozzle. A tension band may run along the horizontal length of an x-axis gantry. A motor with axle may be coupled, which may be via a band, to a pulley, then a band may be coupled to the second pulley, then an axle may be coupled to a third pulley. The belt may be moveable and may move and be engaged with a toothed pulley after bending back via two backbend pulleys. Any two of the three pulleys may be backbend pulleys, and any pulley described herein may be toothed or may not be toothed. The belt is moved and engages the toothed pulley after bending back via the two backbend pulleys.

A z-axis motor may have a spindle coupled to a driving pulley, which may be coupled to a timing belt, and the timing belt may also be coupled to a pulley system, which in some embodiments may include at least four pulleys, and such that the rotation of the motor actuates the rotation of a spindle, which may cause the timing belt to be rotated, such that the rotation of the timing belt, which is attached to the z-axis member, may cause the z-axis member to move in the vertical direction, such as upwards. When the motor causes the spindle to rotate in the opposite direction, then the z-axis member is moved in the opposite direction, such as downwards.

A delivery hose may be coupled to a lower pulley; on either side of the lower pulley may be disposed a wheel; above the lower pulley may be an upper pulley flanked by a pair of fins; this arrangement may allow for support of a substantially 90 degree bend in the hose.

The system can include a plurality of cords or wires protected in a flexible cord cover or a belt.

A vertical plate motor may be coupled to a driving pulley wherein the driving pulley may be directly coupled to the vertical plate motor or may be indirectly coupled to the vertical plate motor, as the vertical plate motor is connected to a pulley through the plate, and the pulley is coupled via a timing belt or belt to spindle or pulley that is on the opposite side (through the plate) of an adjacent pulley.

In some embodiments, a cord coupled to a stepper motor allows for the extension and contraction of a telescoping tube with the assistance of gravity moving the distal end downward and the tautness of the cord determining the height of the distal end. The z-beam can be coupled directly or indirectly to a hose, nozzle, couplers, and a printhead. In some examples, a motor may be disposed between any sections of a hose or couplers.

In some examples, a printing nozzle can be a seven-inch single pass nozzle, which may also be a printhead, is depicted; other nozzles may be used. A seven-inch single pass nozzle would be capable of printing sections that are 7 inches wide in the direction perpendicular to the direction of travel by the printhead. In some examples, a nozzle may have two output ports. Printing via two output ports would allow printing of the inside and outside sections of a hollow wall.

In some examples, a printing material generation system may have a first mixer configured for mixing substantially dry materials, a first mixer vertical elevator, a second mixer configured for mixing substantially wet materials, a wet mix vertical elevator, a wet pump, wherein the wet pump is coupled to the delivery hose.

A dry-wet mixer configured to mix dry and wet materials in stages or simultaneously may receive the input of materials and then produce a mixed output of materials which are delivered via a conduit to a wet pump coupled to a delivery hose.

A variable control system can be communicatively coupled to one or more sensors and the sensors provide information to the variable control system in a feedback loop configuration. The variable control system can include a processor or various components that function as a process coupled to a non-transitory storage medium, and the variable control system can be configured to alter the composition of the deposition material by adding chemicals, liquids, or other materials. Such may be accomplished by separate dispensers controlled by the variable control system to increase or decrease the amount of each additive in the curable material.

Sensors may be any type of environmental or ambient condition sensor. For example, and not by way of limitation, sensors may include one or more temperature sensors, humidity sensors, viscosity sensors, wind sensors, pressure sensors, concrete moisture sensors, etc.

Sensors may be communicatively coupled to an interface of the variable control system. The input of sensors may be used to alter the speed of one or more dispenser, such as a dry mixer dispenser and a wet mixer dispenser; a control system may then send commands to a dry mix dispenser or a wet mix dispenser.

In some embodiments of the present invention, the communication between sensors and variable control system are some sort of wireless communication protocol with the communication process being conducted by an interface. However, in certain applications, wired communication links may be used to communicatively couple sensors to the interface of the variable control system. In this case, the interface can include wiring jacks, lugs, or other means of physically connecting wires to the variable control system via the interface.

Control elements may be any type of environmental or ambient control mechanism. For example, and not by way of limitation, control elements may include one or more water vapor misting systems, heating, or cooling elements, etc.

Regardless of the communication protocol or connectivity solution employed, sensors and control elements can work as a feedback mechanism to control various aspects of the overall system, thereby ensuring that the finished product meets the production standards for a given admixture.

For example, a temperature sensor and a humidity sensor may be positioned to provide feedback to the variable control system regarding ambient temperature and humidity conditions in the location where the admixture may be deposited. If the temperature and/or humidity in the environment is suboptimal, control elements may be activated to increase or decrease the ambient temperature or raise or lower the amount of humidity in the workspace where the admixture may be deposited.

Similarly, if the viscosity of the admixture is too thick or too thin, as detected by a sensor, the rate of deposition of the admixture may be increased or decreased to ensure proper deposition of the admixture.

In extreme cases, where the integrity of the structure may be compromised based on the ambient conditions, feedback from sensors may result in a cessation of deposition for the admixture to allow time for intervention and corrective action to be taken. Additionally, if controlling the environment of the construction location is not possible (e.g., large unenclosed spaces subject to various weather conditions), variable control system may be used to alter the composition of the deposition material so as to slow down or increase the curing time, for example. Similarly, the admixture may be adapted by the variable control system for multiple applications, depending on and in response to the conditions. The variable control system may be configured to control the printing process and the composition of the deposition material, which may be termed a mortar, by altering the composition, temperature, flow rate, and viscosity of the supply of the deposition material. To achieve the proper level of control, sensors may be located at various locations in the area surrounding the location for the deposition of the deposition materials, such as near ground level, near the next location of the printhead, or at a location that anticipates the impending location of the printhead. Regarding the sensor system, sensors may be disposed on the Z-beam, the nozzle, or the printhead. A device that can warm or cool down with a fan or spray a mist or remove humidity and may be near the nozzle. A GPS unit may be added for geofencing the usable location of the printer.

The vertical length of the z-axis member may be gravity controlled. A stepper motor may pull a cord attached to the printhead to shorten the telescoping length. Gravity may cause the telescoping z-axis member to be as long as its full length. The telescoping member can include tubes that are each smaller than the previous, such as with gasketing or a sealed fit.

Since the first pass is usually the lowest, as the additive manufacturing system prints, the additive manufacturing system may wind a cord, band, or timing band to a sufficient distance to raise the nozzle and printhead one layer height. The pressure in the hose and tube, as well as gravitational forces, may cause the printhead to stay the maximum length allowed by the amount of cord unrolled. A belt or timing belt, that may be coupled to one or more pulleys, one or more gears, or one or more motors, may be attached to the telescoping beam, which may be a telescoping tube. The delivery hose may travel along the side of the telescoping tube; the delivery hose may be coupled directly or indirectly to the telescoping tube.

The telescoping beam may be mounted on a vertical plate; the telescoping beam may comprise nesting tubes of progressively smaller diameter, having a mount on the lower end for a hose or printhead to be attached; the telescoping beam may also have a mount on the side opposite the hose for a cord or band to attach, which is connected to a winding or rotating motor on the higher end, to reel it in or move the band (when, in some examples, the band has teeth like the timing belt) to raise the lower end of the beam, with gravity and the tautness of the band dictating the vertical height.

The disclosed additive manufacturing system may be capable of printing around vertical rebar and may use a modular system for supplying concrete to the printhead. The printhead may be mounted on a z-axis member that may be extendable in the vertical direction; the z-axis member may travel horizontally along a horizontal cross beam, which may be termed the x-axis gantry. The printhead may be configured to move vertically up-and-down to print both more closely to the rebar and allows the horizontal cross beam, which is on tracks at the top of the printer structure, to clear vertical rebar. The x-axis gantry may be at substantially fixed vertical height during printing mode and, in some embodiments, does not move vertically as the cementitious layers being printed increase in height. The z-axis member assembly, which may include a z-axis member, may be attached to rails on a carriage which is attached to a separate set of rails on the horizontal crossbeam.

To accomplish this movement of the z-axis member, a hose management solution can be included. Some embodiments of the additive manufacturing system use a hose of fixed length which may be directly coupled to the nozzle of the printhead. The hose may travel through a channel system on the z-axis member, and then across an extendable and contractible trolley unit system, in which the trolley units have one or more wheels in a wheel unit, and the trolley units are configured to move across the top surface of the horizontal cross beam. Each trolley unit may have one or more wheels that are slidably coupled to a rail of the x-axis gantry. A set of spacers may be positioned at the edges of a trolley unit to prevent the rail-riding wheels from contacting each other and locking up; in some embodiments, a trolley unit may have a set of one or more wheels that are located at the bottom of the trolley unit and frictionally slide across the x-axis gantry, a rail in proximity of the x-axis gantry, or a rail coupled to the x-axis gantry; in some embodiments, the upper, central surface of the trolley unit may have at least one wheel, bearings, or bearing blocks upon which the hose may slide across. The upper, central surface of the trolley units in conjunction with one or more of the other upper central surfaces of an additional trolley unit may form a channel, and at least one fin, at least one flange, or at least one guide may be aligned along the channel and may serve as a barrier that prevents the hose from sliding off the trolley units. The wheel units are attached to each other via a chain or leash, with one end attached to the z-axis carriage and one to the end of the horizontal crossbeam where the hose makes contact with the printer.

An additional hose management device which is located at that point of contact may be used which further reduces shaking of the printer as the hose coils and uncoils on the ground. This device is either pulley or motor driven and moves the hose at a steady rate towards or away from the printer.

The printer's frame may be made of aluminum stage-trussing, which may allow for easier transportation and set-up/teardown, and also may allow wind to pass through the structure without shaking or moving the printer structure, which would impact the printhead's path.

Additionally, the use of aluminum stage-trussing which has rounded poles in each corner of a beam may allow the horizontal cross member to utilize, instead of rails, a wheeled carriage that has wheels which interact with those rounded corner poles at a 30 to 60 degree angle, such as about a 45-degree angle on each of the top two corners. The connection pins for the stage-trussing are selected to extrude as little as possible, and the connections of the trussing may be machined to allow smooth movement of the horizontal crossbeam's carriage. Trussing made of other lightweight materials may also be used.

The material mixing process may include a concrete mixer, elevator, water additive hopper, second elevator, and cement pump which is coupled to the hose. Above each discrete mixer may be a dispenser capable of dispensing dry or wet additives at any point in the mixing process. This may be controlled manually or by the control system of the printer.

Coupled means to be in direct or indirect contact with another object; in some embodiments two or more objects that are coupled may be affixed by some type of physical or nonphysical means such as glue, screw, nail, mating connections, soldering, which also includes being detachably affixed, which means that a relatively temporary means may be used to affix the two or more objects. Nonphysical means include magnetic forces. Detachably coupled refers to temporary coupling such as a ball bearing to a surface where the physical contact between the two objects may be easily removed by gravity or other weak force. As mentioned above, indirect coupling includes Object A being coupled to Object B and Object C being coupled to Object B may mean that Object A may be coupled to Object C even if Object A may not be physically contacting Object C. Additional elements may be coupled to each other in this manner.

The components of the apparatuses and systems for additive manufacturing, as described with reference to the drawings herein, are implementable in a wide variety of different configurations. Thus, the following more detailed description of the embodiments of the system and method of the present invention, are not intended to limit the scope of the invention, but merely a representative of various embodiments of the invention. Unless explicitly stated, the use of "or" means and/or, that is, this the non-exclusive meaning of "or."

For purposes of this disclosure, the additive manufacturing system may also be referred to as a 3D printer or large scale 3D printer or construction printer. The additive manufacturing system may be deployed to deposit a wide variety of deposition materials and may be configured to "print" or "extrude" these materials using control software and supporting components that work in unison including: a premixer; a water distribution mixer; a pumping system: a hose; and may use a stationary or 360 degree rotating head for large and small scale construction with a myriad of different mix formulas, from concrete, foamcrete, hempcrete, geopolymer, epoxy, resin, and other cementitious or similar materials used in the construction of buildings and other items. The described embodiments are to be considered in all respects only as illustrative and not restrictive.

ADDITIONAL EXAMPLES

The following enumerated examples describe example apparatuses for additive manufacturing.

Example 1. An apparatus for additive manufacturing, comprising:
at least three legs comprising trussing beams;
an upper frame supported at a target height by the legs, the upper frame comprising:
an x-axis member extending between two of the legs,
a y-axis member extending between two of the legs,
an x-axis gantry coupled to the y-axis member and extending parallel to the x-axis member, wherein the x-axis gantry is slidably moveable along the y-axis member,
an x-axis carriage coupled to the x-axis gantry and slidably moveable along the x-axis gantry, and
a telescoping z-axis member coupled to the x-axis carriage; and
a cementitious material delivery hose having an outlet coupled to the z-axis member such that the outlet moves along a z-axis.

Example 2. The apparatus of example 1, wherein the upper frame further comprises a second x-axis member and a second y-axis member, wherein the x-axis members and the y-axis members are positioned as sides of a rectangle, wherein legs support each corner of the rectangle, and wherein the x-axis gantry is positioned between the x-axis members.

Example 3. The apparatus of example 1, wherein the x-axis member and y-axis member comprise trussing beams.

Example 4. The apparatus of example 3, wherein the trussing beams comprise aluminum, carbon fiber, fiberglass, or a combination thereof.

Example 5. The apparatus of example 3, wherein the trussing beams comprise corner poles connected by a plurality of diagonals with open space between the diagonals and corner poles.

Example 6. The apparatus of any of examples 1-5, further comprising at least one wheel on a bottom of each of the legs such the legs are rollable on the ground.

Example 7. The apparatus of any of examples 1-6, wherein the x-axis gantry comprises a trussing beam having rounded corner poles and wherein the x-axis carriage comprises wheels that interact at an angle with the rounded corner poles at the top two corners of the x-axis gantry trussing beam.

Example 8. The apparatus of example 7, wherein the angle is from 30° to 60°.

Example 9. The apparatus of any of examples 1-8, further comprising a hose management apparatus mounted to the upper frame holding at least a portion of the delivery hose above the x-axis gantry.

Example 10. The apparatus of any of examples 1-9, further comprising a cementitious material supply tank connected to the delivery hose.

Example 11. The apparatus of any of examples 1-10, wherein the z-axis member comprises a printhead at a lower end of the z-axis member, and wherein the outlet of the delivery hose is connected to the printhead.

Example 12. The apparatus of example 11, further comprising a laser distance sensor on the printhead to measure a distance from the printhead to a printing surface.

Example 13. The apparatus of any of examples 1-12, wherein the z-axis member, the x-axis carriage, the x-axis gantry, or a combination thereof, is coupled to a motor, a gear, a coupler, a pulley, a gear train, a timing band, a power source, or a combination thereof.

Example 14. The apparatus of any of examples 1-13, wherein the z-axis member has a length from about 8 feet to about 100 feet in a fully extended position, and a length from about 1 foot to 20 feet in a fully retracted position.

Example 15. The apparatus of any of examples 1-14, wherein y-axis members and the x-axis members have a length from about 8 feet to about 100 feet.

Example 16. The apparatus of any of examples 1-15, further comprising a cord or band coupled to a motor and to a distal end of the telescoping z-axis member, such that the tautness of the cord or band determines a height of the distal end of the telescoping z-axis member.

Example 17. The apparatus of any of examples 1-16, wherein the telescoping z-axis member comprises nesting tubes of progressively smaller width.

Example 18. The apparatus of any of example 17, wherein the telescoping z-axis member comprises at least three telescoping sections.

Example 19. The apparatus of any of examples 1-18, wherein the telescoping z-axis member does not extend vertically above the x-axis gantry, or extends above the x-axis gantry by a distance of about 4 feet or less, when the telescoping z-axis member is fully retracted to a maximum printing height.

Example 20. The apparatus of any of examples 1-19, further comprising an upper frame elevator that is connectable to the upper frame during construction of the apparatus to lift the upper frame to the fixed height.

Example 21. The apparatus of example 20, wherein the upper frame elevator is integrated in a leg.

Example 22. The apparatus of example 20, wherein the upper frame elevator is a mobile elevator that can be moved from leg to leg to lift each corner of the upper frame before connecting the corners to the legs.

Example 23. The apparatus of any of examples 1-22, further comprising an enclosure covering the legs and upper frame.

Example 24. The apparatus of example 23, wherein the enclosure is a tent.

Example 25. The apparatus of example 24, wherein the apparatus further comprises tent supports connected to the legs, the upper frame, or a combination thereof.

Example 26. The apparatus of example 23, further comprising an environment control element within the enclosure, the environment control element comprising a heater, a cooler, a humidifier, a dehumidifier, a water mister, a vent, or a combination thereof.

Example 27. The apparatus of example 26, further comprising an environment sensor within the enclosure, the environment sensor comprising a thermometer, a humidity sensor, or a combination thereof.

The following enumerated examples describe additional example apparatuses for additive manufacturing. The members may interact to control the movement and location of the printhead.

Example 1. An apparatus for additive manufacturing comprising:
  a dispensing assembly, which may also be called a printhead;
  a hose management apparatus;
  a printing material generating system;
  a three-dimensional positioning assembly;
  a support structure; and,
  a control system
  wherein the dispensing assembly, which may also be called a printhead assembly, comprises:
  a nozzle, which may be rotatable, configured to deliver an amount of curable material;
  a delivery hose coupled to the nozzle,
  wherein the hose management apparatus comprises:
  a plurality of hose guides,
  a plurality of trolley units comprising a first trolley unit and a second trolley unit,
  wherein the first trolley unit comprises:
  a first bearing box,
  a first hose support wheel, wherein the first hose support wheel is detachably coupled to the delivery hose;
  a plurality of guide fins, comprising a first guide fin and a second guide fin,
  a plurality of spacers, comprising a first spacer and a second spacer;
  wherein the second trolley unit comprises a second bearing box;
  a second hose support wheel; wherein the second hose support wheel is detachably coupled to the delivery hose;
  a plurality of guide fins, comprising a third guide fin and a fourth guide fin;
  a plurality of spacers, comprising a third spacer and a fourth spacer;
  wherein first trolley unit is coupled to the second trolley unit, in some embodiments by a cable;
  a hose lifting device,
  wherein the hose management apparatus is coupled to the delivery hose;
  wherein the printing material generation system comprises:
  a first mixer mixing substantially dry materials,
  a first mixer vertical elevator,
  a second mixer configured for mixing wet materials,
  a wet mix vertical elevator,
  a wet pump,
  wherein the wet pump is coupled to the delivery hose;
  wherein the three-dimensional positioning system comprises:
  a z-axis member comprising:
  a z-axis rail,
  a z-axis timing band,
  wherein the z-axis member is coupled to the delivery hose;
  a z-axis movement device comprising:
  a z-axis motor,
  wherein the z-axis motor is coupled to the z-axis timing band;
  a plurality of bearing blocks,
  wherein the plurality of bearing blocks are coupled to the z-axis rail;
  wherein the z-axis movement device is coupled to the z-axis member;
  an x-axis gantry comprising:
  an x-axis carriage,
  an x-axis timing band,
  an x-axis motor,
  a plurality of x-axis rails,
  a plurality of x-axis bearing blocks,
  an x-axis wire management assembly,
  wherein the x-axis carriage is jointly coupled to the z-axis movement device and the x-axis motor, wherein the x-axis motor is coupled to the x-axis timing band,
  wherein the x-axis carriage is coupled to the plurality of x-axis bearing blocks, wherein
  the plurality of x-axis bearing blocks are coupled to the x-axis rails, wherein the x-axis wire management assembly is coupled to the x-axis gantry;
  y-axis carriage comprising:
  y-axis wheels, a y-axis motor,
wherein the y-axis carriages are coupled to the x-axis gantry;
y-axis member comprising:
a y-axis timing band,
a y-axis wire management assembly,
wherein the y-axis member are coupled to the y-axis wheels, wherein the y-axis timing band is coupled to the y-axis motor, wherein the y-axis wire management assembly is coupled to the y-axis member;
wherein the exoskeletal support system comprises:
a plurality of legs,
a plurality of optional levelers,
a plurality of exoskeletal support wheels,
a plurality of support beams,
wherein the exoskeletal exoskeletal support system is coupled to the y-axis member;
wherein the control system comprises:
a computing device,
a power supply,
a plurality of breakers,
wherein the control system (600) is collectively coupled to the printing material generation system, the z-axis motor, the x-axis motor, and the y-axis motor.

Example 2. The apparatus for additive manufacturing of example 1, wherein the nozzle is selected from the group comprising: a double-head nozzle, a single pass head nozzle, which may be seven inches in width, or a stopper-head nozzle.

Example 3. The apparatus for additive manufacturing of example 1, wherein the nozzle is rotated by a rotational motor.

Example 4. The apparatus for additive manufacturing of example 1, wherein the nozzle moves in the z-axis independently from the x-axis gantry.

Example 5. The apparatus for additive manufacturing of example 1, wherein the z-axis member moves in the z-axis independently from the x-axis gantry.

Example 6. The apparatus for additive manufacturing of example 1, wherein the horizontal crossbeam is positioned at fixed height while the z-beam is moved.

Example 7. The apparatus for additive manufacturing of example 1, wherein the z-axis member is capable of telescoping.

Example 8. The apparatus for additive manufacturing of example 7, wherein the z-axis member is comprised of at least two telescoping sections and in some embodiments at least three telescoping sections.

Example 9. The apparatus for additive manufacturing of example 1, wherein the delivery hose is guided along the x-axis gantry from the wet pump to the nozzle via the hose management apparatus.

Example 10. The apparatus for additive manufacturing of example 1, wherein the hose management apparatus is comprised of a plurality of trolley units.

Example 11. The apparatus for additive manufacturing of example 1, wherein the hose management apparatus is comprised of ten trolley units.

Example 12. The apparatus for additive manufacturing of example 1, wherein the delivery hose further comprises a y-coupling joint.

Example 13. The apparatus for additive manufacturing of example 1, wherein the x-axis carriage is coupled to the x-axis gantry via the coupling of the x-axis bearing blocks to the x-axis rails.

Example 14. The apparatus for additive manufacturing of example 1, wherein the x-axis carriage is coupled to the x-axis gantry via the coupling of x-axis wheels to x-axis tracks.

Example 15. The apparatus for additive manufacturing of example 1, wherein the y-axis carriage is coupled to the y-axis beam via the coupling of y-axis bearing blocks to y-axis rails.

Example 16. The apparatus for additive manufacturing of example 1, wherein the y-axis carriage is coupled to the y-axis member via the coupling of the y-axis wheels to the y-axis tracks.

Example 17. The apparatus for additive manufacturing of example 1, wherein the z-axis member, the x-axis member, the y-axis member, the support beams, and the legs are composed of a light-weight material.

Example 18. The apparatus for additive manufacturing of example 1, wherein the z-axis member, the x-axis member, the y-axis member, and the legs are composed of aluminum.

Example 19. The apparatus for additive manufacturing of example 1, wherein the wet pump comprises an auger.

Example 20. The apparatus for additive manufacturing of example 1, wherein the wet pump comprises a hopper. And optional secondary hand mixer.

Example 21. The apparatus for additive manufacturing of example 1, wherein the printing material generation system also comprises a vibration system.

Example 22. The apparatus for additive manufacturing of example 1, wherein the x-axis gantry is coupled to the legs and the y-axis carriages and y-axis member are omitted.

Example 23. The apparatus for additive manufacturing of example 21, wherein the legs are coupled to diagonal supports and the exoskeletal support wheels wherein the exoskeletal support wheels are coupled to a guidance track on the ground.

Example 24. The apparatus for additive manufacturing of example 22, wherein the printing material generation system further comprises a humidity sensor, a thermometer, a water regulator, a water delivery hose, a Y-coupling joint, and separate dispensers for each ingredient additive used to control the qualities of the curable material.

Example 25. The apparatus for additive manufacturing of example 22, wherein the printing material generation system further comprises a component to alter humidity, temperature, and ambient settings.

The invention claimed is:

1. An apparatus for additive manufacturing, comprising:
   at least three legs comprising trussing beams;
   an upper frame supported at a target height by the legs, the upper frame comprising:
     an x-axis member extending between two of the legs,
     a y-axis member extending between two of the legs,
     an x-axis gantry coupled to the y-axis member and extending parallel to the x-axis member, wherein the x-axis gantry is slidably moveable along the y-axis member,
     an x-axis carriage coupled to the x-axis gantry and slidably moveable along the x-axis gantry, and
     a telescoping z-axis member coupled to the x-axis carriage; and
   a cementitious material delivery hose having an outlet coupled to the z-axis member such that the outlet moves along a z-axis.

2. The apparatus of claim 1, wherein the upper frame further comprises a second x-axis member and a second y-axis member, wherein the x-axis members and the y-axis members are positioned as sides of a rectangle, wherein legs support each corner of the rectangle, and wherein the x-axis gantry is positioned between the x-axis members.

3. The apparatus of claim 1, wherein the x-axis member and y-axis member comprise trussing beams.

4. The apparatus of claim 3, wherein the trussing beams comprise aluminum, carbon fiber, fiberglass, or a combination thereof.

5. The apparatus of claim 3, wherein the trussing beams comprise corner poles connected by a plurality of diagonals with open space between the diagonals and corner poles.

6. The apparatus of claim 1, further comprising at least one wheel on a bottom of each of the legs such the legs are rollable on the ground.

7. The apparatus of claim 1, wherein the x-axis gantry comprises a trussing beam having rounded corner poles and wherein the x-axis carriage comprises wheels that interact at an angle with the rounded corner poles at the top two corners of the x-axis gantry trussing beam.

8. The apparatus of claim 7, wherein the angle is from 30° to 60°.

9. The apparatus of claim 1, further comprising a hose management apparatus mounted to the upper frame holding at least a portion of the delivery hose above the x-axis gantry.

10. The apparatus of claim 1, further comprising a cementitious material supply tank connected to the delivery hose.

11. The apparatus of claim 1, wherein the z-axis member comprises a printhead at a lower end of the z-axis member, and wherein the outlet of the delivery hose is connected to the printhead.

12. The apparatus of claim 11, further comprising a laser distance sensor on the printhead to measure a distance from the printhead to a printing surface.

13. The apparatus of claim 1, wherein the z-axis member, the x-axis carriage, the x-axis gantry, or a combination thereof, is coupled to a motor, a gear, a coupler, a pulley, a gear train, a timing band, a power source, or a combination thereof.

14. The apparatus of claim 1, wherein the z-axis member has a length from about 8 feet to about 100 feet in a fully extended position, and a length from about 1 foot to 20 feet in a fully retracted position.

15. The apparatus of claim 1, wherein y-axis members and the x-axis members have a length from about 8 feet to about 100 feet.

16. The apparatus of claim 1, further comprising a cord or band coupled to a motor and to a distal end of the telescoping z-axis member, such that a tautness of the cord or band determines a height of the distal end of the telescoping z-axis member.

17. The apparatus of claim 1, wherein the telescoping z-axis member comprises nesting tubes of progressively smaller width.

18. The apparatus of claim 17, wherein the telescoping z-axis member comprises at least three telescoping sections.

19. The apparatus of claim 1, wherein the telescoping z-axis member does not extend vertically above the x-axis gantry, or extends above the x-axis gantry by a distance of about 4 feet or less, when the telescoping z-axis member is fully retracted to a maximum printing height.

20. The apparatus of claim 1, further comprising an upper frame elevator that is connectable to the upper frame during construction of the apparatus to lift the upper frame to the target height.

21. The apparatus of claim 20, wherein the upper frame elevator is integrated in a leg.

22. The apparatus of claim 20, wherein the upper frame elevator is a mobile elevator that can be moved from leg to leg to lift each corner of the upper frame before connecting the corners to the legs.

23. The apparatus of claim 1, further comprising an enclosure covering the legs and upper frame.

24. The apparatus of claim 23, wherein the enclosure is a tent.

25. The apparatus of claim 24, wherein the apparatus further comprises tent supports connected to the legs, the upper frame, or a combination thereof.

26. The apparatus of claim 23, further comprising an environment control element within the enclosure, the environment control element comprising a heater, a cooler, a humidifier, a dehumidifier, a water mister, a vent, or a combination thereof.

27. The apparatus of claim 26, further comprising an environment sensor within the enclosure, the environment sensor comprising a thermometer, a humidity sensor, or a combination thereof.

* * * * *